No. 766,359. PATENTED AUG. 2, 1904.
W. KELSO.
CAR COUPLING.
APPLICATION FILED JULY 27, 1903.
NO MODEL.
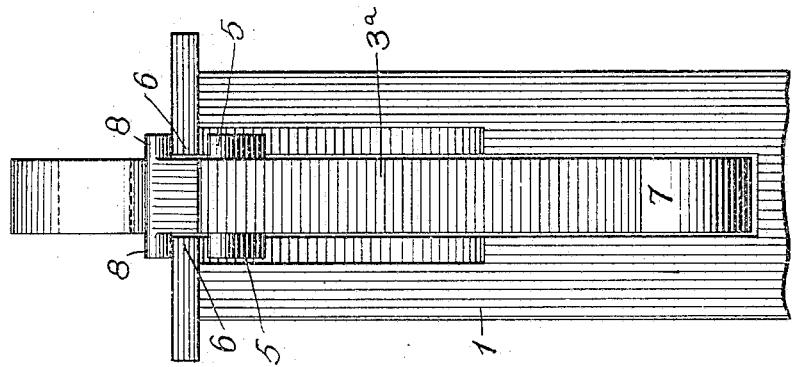
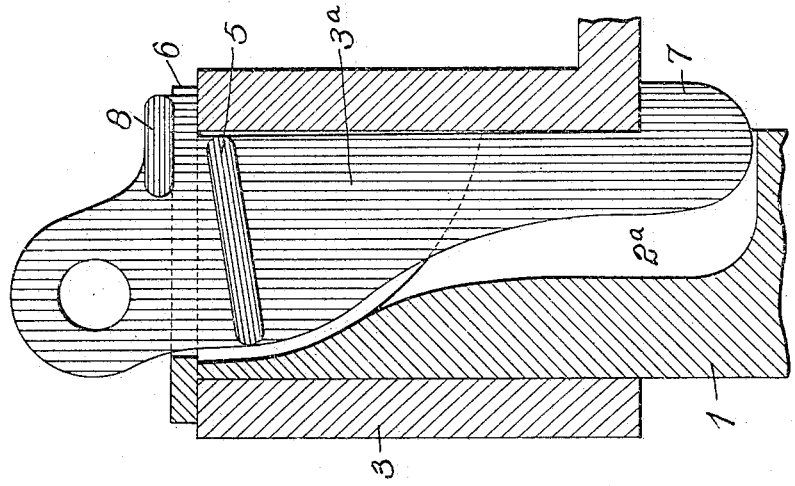
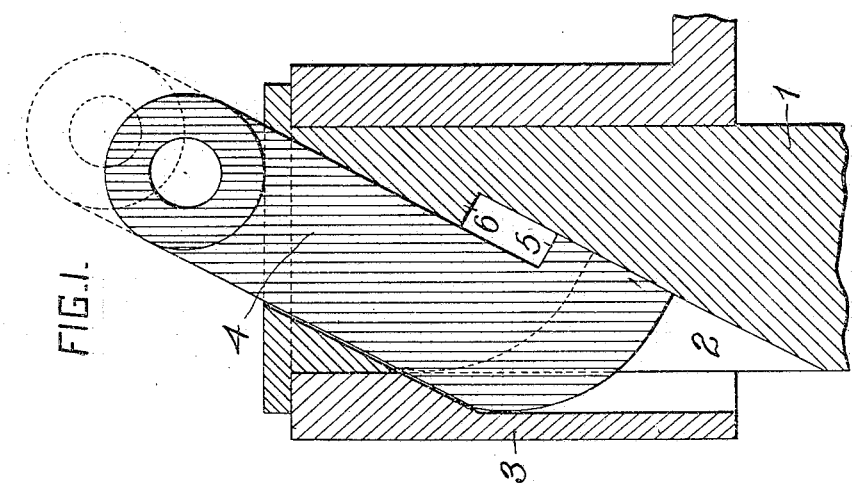
WITNESSES:
Herbert Bradley.
Fred Kirchner.
INVENTOR
William Kelso
by Christy & Christy
Att'ys No. 766,359. Patented August 2, 1904.

UNITED STATES PATENT OFFICE.

WILLIAM KELSO, OF PITTSBURG, PENNSYLVANIA.

CAR-COUPLING.

SPECIFICATION forming part of Letters Patent No. 766,359, dated August 2, 1904.

Application filed July 27, 1903. Serial No. 167,167. (No model.)

*To all whom it may concern:*

Be it known that I, WILLIAM KELSO, a citizen of the United States, residing at Pittsburg, in the county of Allegheny and State of Pennsylvania, have invented or discovered certain new and useful Improvements in Car-Couplers, of which improvement the following is a specification.

The invention described herein relates to certain improvements in locking mechanism employed for preventing any accidental unlocking movement of the locking block or pin; and the invention has for its object the provision of a dog or pawl which in normal position will engage a portion of the coupler-head and prevent any upward creeping of the locking block or pin and will when raised interlock with the locking block or pin, so that after a preliminary upward movement of the dog it will engage the pin and raise the locking-pin from engagement with the tail of the knuckle.

The invention is hereinafter more fully described and claimed.

In the accompanying drawings, forming a part of this specification, Figure 1 is a sectional elevation of portions of a coupler-head and locking-pin, the latter having my improvement applied thereto. Fig. 2 is a similar view illustrating a modification of the improvement, and Fig. 3 is a rear elevation of the form of pin and dog shown in Fig. 2.

In the practice of my invention the locking-pin 1, which is employed for holding the swinging hook or knuckle of the Master Car-Builders' type of coupler in closed position, is of the usual or any suitable form or construction. A slot or passage 2 is formed in this pin, said slot or passage extending in the construction shown in Fig. 1 from the top of the pin diagonally down and through one side thereof, the lower end of this passage or slot being below some portion of the coupler-head 3—as, for example, the top wall of the head—or in line with a recess in the coupler-head. A dog or pawl 4 is so arranged in this slot or passage that when free to move and when the pin is in normal or locking position its lower end will project beyond the pin and under a portion of the coupler-head, as shown in Fig. 1. The dog or pawl is provided with a shoulder or abutment 5, adapted to engage a shoulder or abutment 6 on the pin. These shoulders or abutments are so arranged as to come into engagement when the dog or pawl has been so shifted that its lower end will not engage with the coupler-head when the pin is raised. The upper end of the dog or pawl is adapted to be connected in any suitable manner to a lifting mechanism, whereby the dog may be shifted to release the pin. Then on the further upward movement of the dog, the shoulders or abutments 5 and 6 being in engagement, the locking-pin may be raised to release the swing hook or knuckle.

In the construction shown in Figs. 2 and 3 the dog or pawl $3^a$ is so arranged as to have a rocking or swinging movement in the slot or recess $2^a$ in the locking-pin. The fulcrum of the dog or pawl is arranged at one side of the center of gravity of the dog, so that the lower end will have a tendency or bias to swing outwardly, and thereby bring the toe 7 on its lower end under a portion of the coupler-head. In the construction shown the fulcrum of the dog is formed by a shoulder 8 thereon resting on the top of the pin. The shoulder 8 being at one side of the dog, the weight of the latter will tend to force the toe outwardly under the top wall of the coupler-head, and thereby lock the pin down. The upper end of the dog is adapted to be connected to the pin-lifting mechanism, which when operated will first swing the dog on its fulcrum to withdraw the toe 8. By this swinging movement the shoulders or abutments 5 and 6 on the dog and pin, respectively, will be brought into engagement, so that on the further operation of the lifting mechanism the pin will be raised to release the swinging hook or knuckle.

It is characteristic of my improvement that the dog or pawl has a movement independent of the pin to lock and unlock the latter and that after its preliminary unlocking movement it engages or interlocks with the pin and serves as a connection between the pin and its lifting mechanism.

I claim herein as my invention—

A locking block or pin for car-couplers of the Master Car-Builders' type, provided with an inclined slot or passage and having a shoulder or abutment arranged in said slot or passage, a lifting dog or pawl movably arranged in the slot or passage and provided with a shoulder adapted to interlock with the shoulder or abutment in the passage, in combination with a coupler-head having a recess for the reception of the lower end of the dog or pawl when the locking-pin is in locking position, substantially as set forth.

In testimony whereof I have hereunto set my hand.

WILLIAM KELSO.

Witnesses:
 DARWIN S. WOLCOTT,
 F. E. GAITHER.